US 8,467,326 B2

(12) United States Patent  (10) Patent No.: US 8,467,326 B2
Deprun  (45) Date of Patent: Jun. 18, 2013

(54) APPARATUS AND METHOD OF OPTIMIZING THE POWER SAVING IN A HANDSET WITH WLAN AND BLUETOOTH

(75) Inventor: Jean-Francois Deprun, Paris (FR)

(73) Assignee: LG Electronics Inc., Seoul (KR)

( * ) Notice: Subject to any disclaimer, the term of this patent is extended or adjusted under 35 U.S.C. 154(b) by 1200 days.

(21) Appl. No.: 11/847,256

(22) Filed: Aug. 29, 2007

(65) Prior Publication Data
US 2008/0058031 A1    Mar. 6, 2008

(30) Foreign Application Priority Data

Aug. 31, 2006   (EP) ..................................... 06291380

(51) Int. Cl.
  *G08C 17/00*    (2006.01)
(52) U.S. Cl.
  USPC ........................ 370/311; 370/338; 455/552.1
(58) Field of Classification Search
  None
  See application file for complete search history.

(56) References Cited

U.S. PATENT DOCUMENTS

| | | | |
|---|---|---|---|
| 6,741,836 B2* | 5/2004 | Lee et al. | 455/41.2 |
| 7,099,671 B2* | 8/2006 | Liang | 455/450 |
| 7,142,882 B2* | 11/2006 | Schmidt | 455/552.1 |
| 7,299,009 B2* | 11/2007 | Hussmann | 455/41.2 |
| 7,747,279 B2* | 6/2010 | Hoddie | 455/557 |
| 2002/0059434 A1* | 5/2002 | Karaoguz et al. | 709/228 |
| 2003/0118015 A1 | 6/2003 | Gunnarsson | |
| 2005/0034001 A1* | 2/2005 | Pontarelli | 713/320 |
| 2005/0186906 A1* | 8/2005 | Hussmann | 455/41.2 |
| 2006/0003802 A1* | 1/2006 | Sinai | 455/553.1 |
| 2006/0262739 A1* | 11/2006 | Ramirez et al. | 370/311 |

FOREIGN PATENT DOCUMENTS

| | | |
|---|---|---|
| EP | 1414190 A1 | 4/2004 |
| WO | 0032002 A1 | 6/2000 |

\* cited by examiner

*Primary Examiner* — Brian Roberts
(74) *Attorney, Agent, or Firm* — Lee, Hong, Degerman, Kang & Waimey

(57) ABSTRACT

Methods and a mobile terminal capable of selecting a wireless network from a Bluetooth network to a WLAN, the terminal includes a Bluetooth module; a WLAN module; a storage device; and a controller cooperating with the Bluetooth module, the WLAN module and the storage device such that the Bluetooth module is configured to be activated in the mobile terminal; a Bluetooth connection is established with the access point; the WLAN module is configured to be activated and to scan to search the access point; and a WLAN connection is established between the access point and the mobile terminal.

22 Claims, 3 Drawing Sheets

APPARATUS AND METHOD OF OPTIMIZING THE POWER SAVING IN A HANDSET WITH WLAN AND BLUETOOTH

CROSS-REFERENCE TO RELATED APPLICATIONS

Pursuant to 35 U.S.C. §119(a), this application claims the benefit of earlier filing date and right of priority to European Patent Application No. 06291380.1, filed on Aug. 31, 2006, the contents of which are hereby incorporated by reference herein in their entirety.

BACKGROUND OF THE INVENTION

1. Field of the Invention

The present invention relates to a wireless communications device. More particularly, the present invention relates to an apparatus and a method of optimizing the power saving in a wireless communications device.

2. Description of Related Art

As more and more current electronic gadgets become mobile, demand for mobile or wireless internet accesses anywhere and anytime increases. Accordingly, wireless internet or intranet accesses may surpass the traditional wired internet access in a very near future. In cities that offer a city-wide free or very cheap wireless internet access, such as a hot spot, the future may have been realized earlier. People with a laptop, personal data aid (PDA) or even a wireless mobile phone can access the internet via a mobile telecommunications networks, wireless local area network (WLAN) access points such as IEEE 802.11 or Bluetooth. Although the mobile telecommunications networks may provide the mobile terminals with a consistent, extensive coverage for the internet access, it may be still more expensive and slower than using the WLAN or Bluetooth. As long as the user has a prearranged subscription to the hot spots, the user of the mobile terminal such as the laptop, the mobile phone or PDA may access the internet with a relatively high communication speed. Accordingly, the mobile terminal using WLAN may provide the user with cheaper cost for data and/or voice communication and faster, higher data rate than the regular mobile terminal using the mobile telecommunications networks.

Although the WLAN offers the faster communication speed in comparison with that of mobile telecommunications network, it has several shortcomings. First, because the service area of the WLAN is relatively small when compared to that of the mobile telecommunications network service. Next, the mobile terminal may have to periodically scan the network channel to detect the WLAN hot spot or access point when the mobile terminal should move from one hot spot to another one or move outside of the hot spot. As the mobile terminal may have to constantly check if it is within the hot spot using its radio transceiver, the power consumption of the mobile terminal may substantially increase. Since the most mobile terminals are battery-powered, the reduction of the battery life can undercut the effectiveness of the true mobility of the mobile terminal. If the user does not want the mobile terminal to automatically scan the WLAN cell or coverage area, the user may have to manually select the WLAN communication when he or she needs it. With this strategy, the use of the WLAN capable mobile terminal is not automatic and not user-friendly.

SUMMARY OF THE INVENTION

One aspect of the present invention pertains to the recognition by the present inventors about the background art problems explained above. Namely, it would be advantageous to implement a strategy to optimize the power consumption of the mobile terminal accessing an internet or intranet by using the WLAN.

It is an object of the present invention to provide a method of selecting a wireless network in a mobile terminal, the method comprising the steps of: activating a first network module; receiving a first network inquiry command in a certain interval from an access point; sending a first network inquiry response to the access point; receiving an inquiry for establishing a connection between the access point and the mobile terminal from the access point; activating a second network module and scanning to search the access point via the second network module; and establishing a second network connection between the access point and the second network module in the mobile terminal, wherein the first network is operating in a lower data transfer rate than the second network and the first wireless network is a Bluetooth™ and the second wireless network is a Wireless Local Area Network (WLAN).

It is another object of the present invention to provide a method of selecting a wireless network in a wireless communication system comprising a mobile communications device and at least one access point, the method comprising the steps of: determining whether the mobile communications device is requested to access a Wireless Local Area Network (WLAN); activating a first wireless network module in the mobile terminal upon the determining; sending a first wireless network inquiry command in a certain interval to the mobile communications device from an access point; receiving a first wireless network inquiry by the first wireless network module in the mobile communications device; sending a first wireless network inquiry response to the access point via the first wireless network module; sending an inquiry for establishing a first wireless network connection to the mobile communications device from the access point; activating a second wireless network module in the mobile communications device; and establishing a second wireless network connection between the access point and the second wireless network module, wherein the first wireless network is operating in a lower data transfer rate than the second wireless network and the first wireless network is a Bluetooth™ and the second wireless network is a Wireless Local Area Network (WLAN). The method further comprises sending information with respect to the first wireless network module and the second wireless module to the access point after the step of activating the second wireless network module.

To achieve these and other advantages and in accordance with the purpose of the present invention, as embodied and broadly described herein, there is provided a solution for power consumption for a method in a wireless communication system comprising a mobile communications terminal and at least one access point, the method comprising the steps of sending a first wireless network inquiry command to the mobile communications terminal activating a first wireless network module; receiving a first wireless network inquiry response from the first wireless network module; sending an inquiry for establishing a first wireless network connection to the mobile communications terminal; and establishing a second wireless network connection between the access point and the wireless communications terminal activating a second wireless network module, wherein the first wireless network is operating in a lower data transfer rate than the second wireless network. The first wireless network is a Bluetooth™ and the second wireless network is a Wireless Local Area Network (WLAN).

To achieve these and other advantages and in accordance with the purpose of the present invention, the present invention provides a solution for power consumption for a mobile terminal capable of selecting a wireless network from a first wireless network to a second wireless network, the terminal comprising: the first wireless network module for establishing a link with at least one access point; the second wireless network module for establishing a link with the at least one access point; a storage device to store information with respect to the first wireless network module and the second wireless network module; a controller cooperating with the first wireless network module, the second wireless network module and the storage device to perform, activating a first wireless network module in the mobile terminal; establishing a first wireless network connection with the access point; activating a second network module and scanning to search the access point via the second network module; and establishing a second network connection between the access point, wherein the first network is operating in a lower data transfer rate than the second network. The first wireless network is a Bluetooth™ and the second wireless network is a Wireless Local Area Network (WLAN).

BRIEF DESCRIPTION OF THE DRAWINGS

The present invention will be described by the accompanying drawings that illustrate various exemplary embodiments. The illustrated embodiments are simply examples of the present invention and do not limit the scope thereof.

DETAILED DESCRIPTION OF THE INVENTION

As an overview, it is desirable to optimize the power consumption of the mobile communications terminal including a WLAN and Bluetooth modules.

Figure 1:
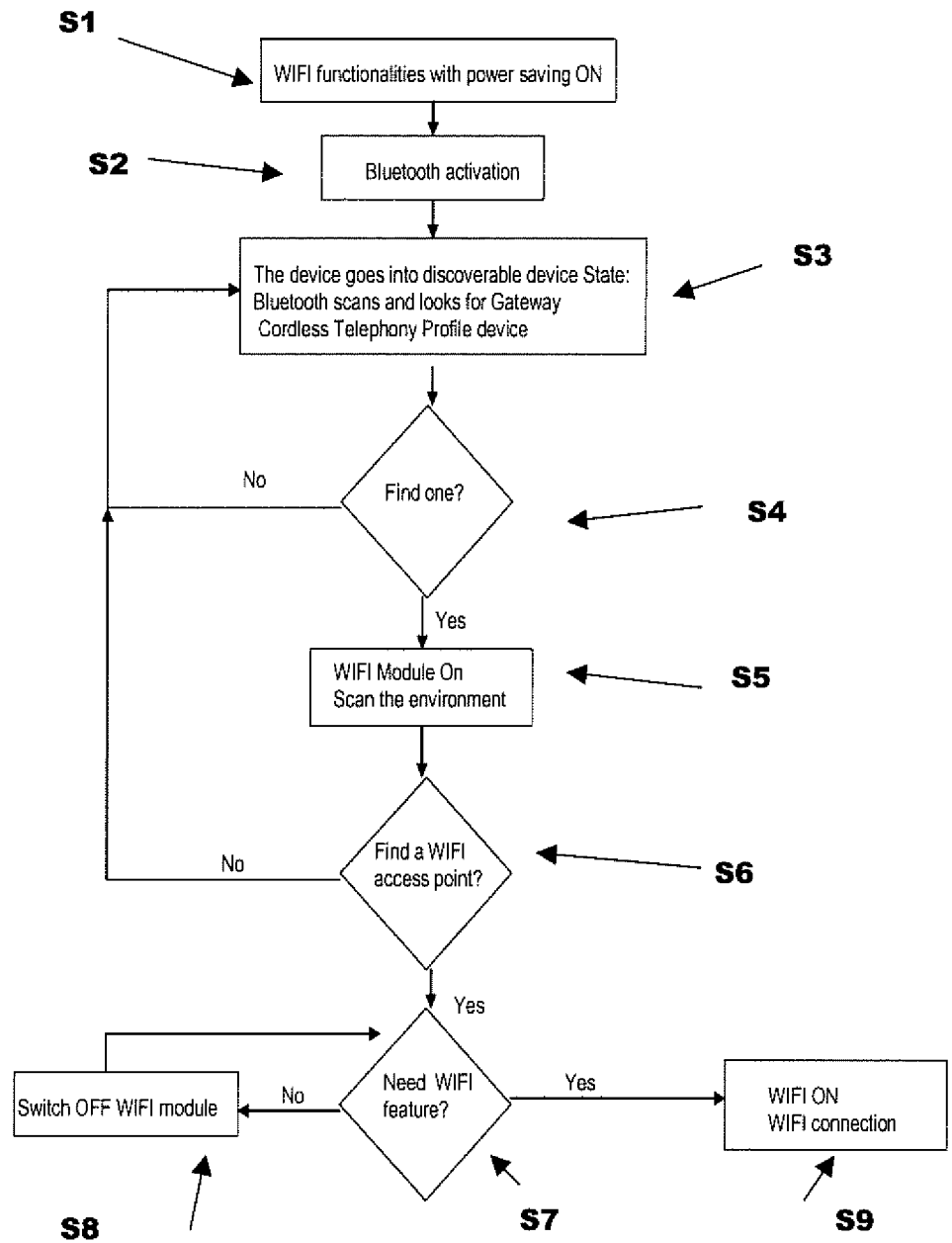
FIG. 1 is a flowchart showing a method of selecting a wireless network in a mobile terminal according to the present invention.

Referring now to the accompanying drawings, FIG. 1 depicts a flowchart showing a method of selecting a wireless local area network (WLAN) in a mobile communications terminal. At the mobile communications terminal, it can be first determined whether WLAN functionalities with power saving or optimization feature is turned on when a user wants to use the WLAN feature of his or her terminal (step S1). Here, the WLAN can comprise a Wireless Fidelity (WI-FI), Wi-Max™, Wi-Bro™ and Brew™. It is clear that other types of WLAN or similar operations may also be supported by the features of the present invention. Then, the mobile communications terminal may activate a first network or Bluetooth module but not a second network, WLAN, module to scan a first network or Bluetooth network (step S2). It is noted that a wireless local network communication is performed via an access point or hotspot. The access point can be used for both the WLAN and Bluetooth or can further comprise a first access point for the first wireless network, Bluetooth and a second access point for the second wireless network, WLAN. Activation of the Bluetooth module can allow the mobile terminal to have lower power consumption than activating the WLAN, preferably WIFI for example, module to scan the hotspot. Assuming that the coverage of the Bluetooth and WIFI can be same when the emission power is the same, an exemplary comparison of the WIFI and Bluetooth's power consumption can be as follows. In order to operate the Bluetooth module, the mobile communications terminal may require 1 mW for instance. In contrast the WIFI module may require 100 mW. Accordingly, it is desirable to activate the less power consuming wireless network module to accomplish the same goal. The scope of the present invention is not intended to be limited to any particular power consumption measurement such as 1 mW or 100 mW as described above. The power comparison shows an exemplary illustration of disparity between the power consumption required to operate the Bluetooth module and that required for the WIFI module at the mobile terminal.

The WIFI/Bluetooth hotspot or access point may send in a certain interval an inquiry command to detect new Bluetooth device within its coverage area. Here, the access point can be configured to communicate with the mobile terminal enabling the WLAN and/or Bluetooth™ and a computer having the WLAN and/or Bluetooth™ module. At the mobile terminal, the mobile terminal goes into discoverable device state and the Bluetooth module can scan to look for a Gateway Cordless Telephony Profile Device (GCTPD) after the step of activating the Bluetooth module, when the GCTPD is used in the access point the environment to detect Bluetooth product (s). The scope of the present invention is not intended to be limited to any particular type of access point such as GCTPD.

Then, it can be determined whether the Bluetooth module finds any GCTP devices (step S4). If the module can't find the GCTP device, the method may repeat the step S2 to detect one. When the Bluetooth module cannot detect the Bluetooth access point in the step S4 after a certain number of attempts, the mobile terminal can switch off the Bluetooth module and inform the user of the result or ask the user whether the WIFI module should be turned on to continue the detecting process.

If the WIFI module finds one or receive an inquiry for establishing a connection between the hotspot or access point and the mobile communications terminal, the mobile communications terminal may turn on the second network module or WIFI module and scan to search the access point via the WIFI module (step S5). Next, the mobile terminal can send parameters and profile information with respect to the first network, Bluetooth, module and the second network, WIFI, module to the access point after the step of activating the WIFI module. It is possible to provide numerous profiles for different features. For example, the mobile terminal can send a Hands-Free profile if the car of the user has a WIFI feature and the user wants to access to the WIFI.

Then, a Bluetooth™ Page State can be enabled at the mobile terminal after the step of sending the parameter and profile information.

After that, it can be determined if the mobile terminal finds the WIFI access point (step S6). If the module can't find the WIFI access point, the method may repeat the above step S4. The mobile terminal may go into a discoverable device state to scan to search a Gateway Cordless Telephony Profile Device (GCTPD) using the Bluetooth module if the WIFI module scans and detects no access point in WIFI network. Then, the WIFI module may be deactivated after the step of activating the first network, Bluetooth module.

If the mobile terminal finds the access point, in the step of S7, the method determines whether any wireless network service via the WIFI is needed. If a user of the mobile terminal does not want to use the wireless network feature, such as access to the Internet, via the WIFI module, the mobile terminal may switch off the WIFI module (step S8). If it is determined that the user desires to use the WIFI service, the mobile terminal can establish a connection between the WIFI access point and the mobile terminal (step S9). For example, the mobile terminal can perform a Voice-Over-Internet-Protocol (VOIP) by using the WIFI.

As described above, the present invention enables the terminal to first detect the WIFI/Bluetooth hotspot by using the Bluetooth module first and turn on the WIFI module to establish the WIFI connection between the hotspot and the terminal upon the detection of the hotspot via the Bluetooth module. Because the Bluetooth service is operating in a lower data transfer rate than the WIFI service, the power consumption for accessing the wireless network service can be optimized. It should be noted that the scope of the present invention is not intended to be limited to the above method steps.

Figure 2:
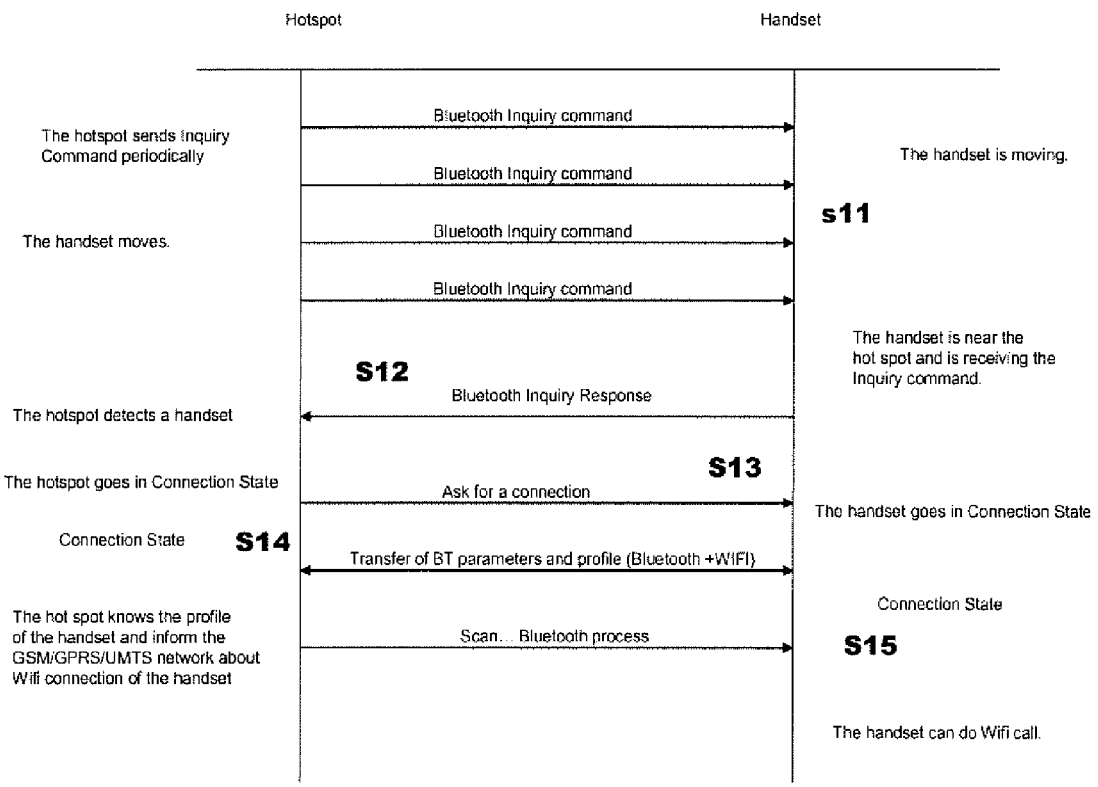
FIG. 2 is an exemplary operational flow of selecting a wireless network in a wireless communications system according to the present invention.

The embodiment of FIG. 2 illustrates an exemplary operational flow of selecting a wireless network in a wireless communications system according to the present invention. As illustrated in FIG. 2, a wireless communication system may comprise a mobile communications device or a handset and at least one access point or hotspot. The hotspot can send an inquiry command periodically to detect nearby device requesting to access the hotspot. Here, hotspot sends a first wireless network or Bluetooth inquiry command to any Bluetooth enabled device (step S11). Usually, the Bluetooth devices can use the inquiry procedure to discover nearby devices, or to be discovered by devices in their locality. A Bluetooth device that tries to find other nearby devices may be called as an inquiring device and actively send inquiry requests. The hotspot in FIG. 2 can comprise the inquiring device to actively send the requests. Conversely, Bluetooth devices available to be discovered may be called as discoverable devices and listen for these inquiry requests and send responses. The handset or the mobile device of FIG. 2 can be the discoverable device. The inquiry procedure may use a special physical channel for the inquiry requests and responses. In addition, the hotspot can mange multiple Bluetooth devices simultaneously, both inquiring and discoverable devices can be connected to other Bluetooth devices at the hotspot.

Note that the hotspot can periodically send the inquiry command as described above and this period can be defined by the Inquiry-Scan-Interval. To optimize the power consumption of the handset, the interval or period can be very short. For example, it can be between 11.25 to 2560 msec. With a short time, the power consumption of the hotspot may be higher but it is not a problem because the hotspot is usually connected to an electrical power outlet. Upon receiving the inquiry command from the hotspot, the handset can activate a Bluetooth module and scan the Bluetooth frequency to identify a Bluetooth hotspot.

When the mobile communications device or handset can identify the hotspot, the handset sends the Bluetooth inquiry response back to the hotspot (step S12). Upon receiving the Bluetooth inquiry response from the handset, the hotspot can detect the handset. Next, the hotspot may go in a connection state and send an inquiry for establishing a Bluetooth connection to the mobile communications device (step S13). Upon receiving the inquiry for establishing the Bluetooth connection from the access point, the mobile communications device or handset can go in the connection state and activate a second wireless network or WIFI module. Here, the scope of the present invention is not intended to be limited to WIFI but other network type from the WLAN may be used as described earlier.

Figure 3:
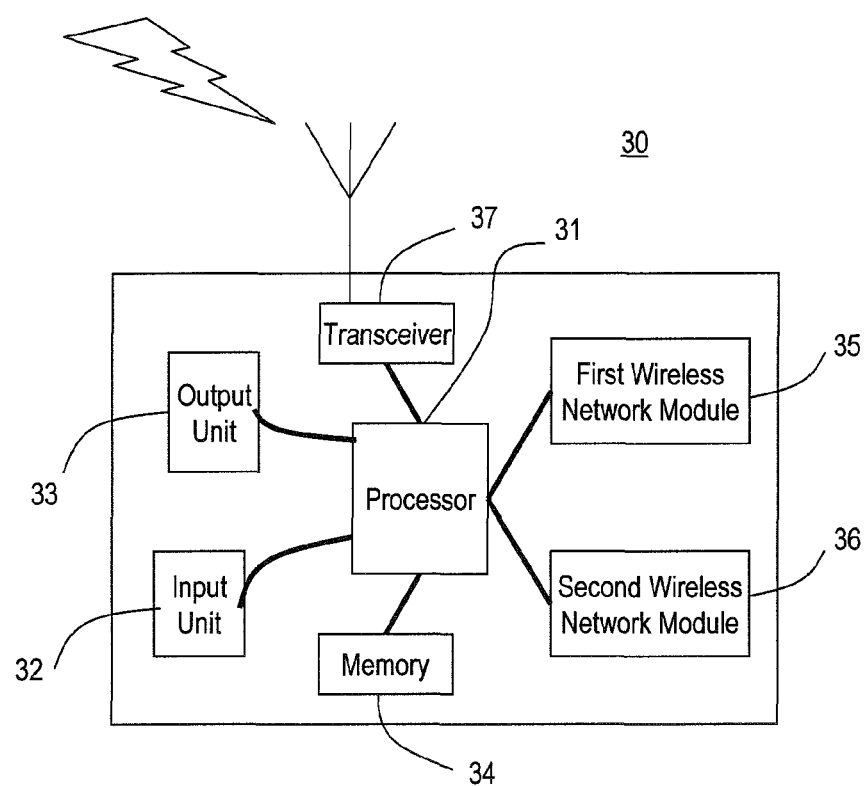
FIG. 3 is an explanatory diagram of the mobile communications terminal including the wireless network modules according to the present invention

After activating the WIFI module, the mobile communications device can transfer information regarding the Bluetooth module and the WIFI module to the hotspot (step S14). The information can include Bluetooth parameters and/or profile information of both the Bluetooth and WIFI module. The information regarding the Bluetooth and WIFI modules can be stored in a memory device in the mobile communications device as illustrated in FIG. 3. After receiving the necessary profile information regarding the wireless network modules of the mobile communications device, the hotspot can inform a mobile telecommunications network about the WIFI connection between the hotspot and the mobile communications device. Here, it is noted that the mobile telecommunications network may comprise 2G, 3G and the subsequent networks (e.g. GSM, CDMA, UMTS, WCDMA, etc.) because certain concepts and features thereof are common to those of the present invention, and thus allow implementation in various types of communications schemes. Once the WIFI connection between the hotspot and the mobile device is established, the mobile device can use the WIFI for further processing, such as the VOIP or Internet surfing. When the mobile device loses the Bluetooth connection for any reason before establishing the WIFI connection, the hotspot may again start its inquiry procedure (step S15). The scope of the invention may be related to any specific kind of a mobile terminal or device, including a PDA, a notebook computer, Ultra Portable Mobile Computer (UMPC), and so forth.

Referring to FIG. 3, a mobile communication terminal 30 can comprise a Bluetooth module 35 for establishing a link with at least one Bluetooth access point, a WLAN module 36 for establishing a link with the at least one WLAN access point (e.g. WIFI hotspot as illustrated in FIG. 2), a memory or storage device 34 to store information with respect to the Bluetooth module 35 and the WLAN module 36, a controller or processor 31, an input unit 32, an output unit 33 to display data, and a transceiver 37 in communication with the base station.

As illustrated in FIGS. 2-3, the mobile communication terminal 30 comprises both the Bluetooth module 35 and the WLAN module 36 in accordance with the present invention. Thus, with the employment of both Bluetooth and WLAN protocols, the mobile communication terminal 30 can reap the benefit of each protocol. First, it is noted that the Bluetooth connection has good results for all applications needed low data rate and Bluetooth can be used for a voice call because a quality of service (QoS) is relatively better. Further, the Bluetooth protocol can allow the mobile terminal to work in noisy environment. For example, even if WIFI or other 2.4 GHz wireless applications are working near the Bluetooth module 35, the Bluetooth transmission may not be disrupted. The applications using Bluetooth can be voice and small file transfers including small multimedia data. Conversely, the WIFI protocol can be used in the higher date rate which is suited for big file transfer. Accordingly, the Bluetooth module 35 can be used for VOIP with the mobile communications terminal 30 and the WLAN/WIFI module 36 can be used for transferring large files with a personal computer.

In accordance with the embodiment of the present invention, there is provided a method of selecting a wireless network in a mobile terminal, the method may comprise the steps of: activating a first network module; receiving a first network inquiry command in a certain interval from a first network; sending a first network inquiry response to the first network; receiving an inquiry from the first network for establishing a connection between the first network and the mobile terminal; activating a second network module and scanning a second network; and establishing a second network connection between the second network and the second network module, wherein the first network is operating in a lower data transfer rate than the second network, wherein a communication between the mobile terminal and the first network or second network is performed via an access point. The method further comprises sending parameter and profile information with respect to the first network module and the second module to the access point after the step of activating the second network module and enabling a Bluetooth™ Page State at the mobile terminal after the step of sending the parameter and profile information, and scanning to look for a Gateway Cordless Telephony Profile Device (GCTPD) after the step of activating the first network module, wherein the GCTPD is used in the access point, wherein the first network is a Bluetooth™ and the second network is a Wireless Local Area Network (WLAN), wherein the access point is configured to communicate with a mobile device enabling the WLAN and/or Bluetooth™ and a computer having the WLAN and/or Bluetooth™ module, and wherein the WLAN comprises one of a Wireless Fidelity (WI-FI), Wi-Max™, Wi-Bro™ and Brew™, wherein the mobile terminal performs a Voice-Over-Internet-Protocol (VOIP) via the first or second wireless network, wherein the mobile terminal goes into a discoverable device state to scan to search a Gateway Cordless Telephony Profile Device (GCTPD) using the first network module if the second network module scans and detects no access point in a second network. Furthermore, the method can comprise deactivating the second network module after the step of activating the first network module, and reactivating the first network module to scan to search the access point if the second network module scans and detects no access point after a certain number of attempts or a signal power of the second network connection drops below a certain threshold.

The exemplary embodiment of the present invention provides a method of allowing a mobile communications device including a first wireless network module and a second wireless network module to select a wireless network, the method comprising the steps of: determining whether the mobile communications device requests to access a Wireless Local Area Network (WLAN); sending a first wireless network inquiry command in a certain interval from a first wireless network to the mobile communications device; receiving a first wireless network inquiry response from the first wireless network module; sending an inquiry from the first wireless network for establishing a first wireless network connection to the mobile communications device; and establishing a second wireless network connection between a second wireless network and the second wireless network module, wherein the first wireless network is operating in a lower data transfer rate than the second wireless network, and wherein a communication between the mobile communications device and the first wireless network or second wireless network is performed via an access point. The method can also comprise sending information with respect to the first wireless network module and the second wireless module to the access point after the step of activating the second wireless network module. Here, the first wireless network is a Bluetooth™ and the second wireless network is a Wireless Local Area Network (WLAN).

In accordance with the embodiment of the present invention, there is provided a mobile terminal capable of selecting a wireless network from a first wireless network to a second wireless network, the terminal comprising; a first wireless network module for establishing a link with a first access point; a second wireless network module for establishing a link with a second access point; a storage device to store information with respect to the first wireless network module and the second wireless network module; a controller cooperating with the first wireless network module, the second wireless network module and the storage device such that the first wireless network module is configured to be activated in the mobile terminal; a first wireless network connection is established with the first access point; the second network module is configured to be activated and to scan the second access point; and a second network connection is established with the second access point, wherein the first network is operating in a lower data transfer rate than the second network wherein the controller is configured to send a first network inquiry response to the first access point in response to a first network inquiry received from the first access point and transmit parameters and profile information with respect to the first wireless network module and the second wireless module to the second access point after receiving an inquiry for establishing a connection between the second access point and the mobile terminal from the access point, wherein the first wireless network is a Bluetooth™ and the second wireless network is a Wireless Local Area Network (WLAN), wherein the WLAN comprises one of a Wireless Fidelity (WI-FI), Wi-Max™, Wi-Bro™ and Brew™, wherein the mobile terminal is configured to perform a communication via a Voice-Over-Internet-Protocol (VOIP) in the first or second wireless network. The terminal may further comprise a display screen showing a user interface capable of allowing a user of the mobile terminal to select at least one of the Bluetooth™ and WLAN modules to access the access point and an input unit allowing a user of the mobile terminal to select at least one of the Bluetooth™ and WLAN modules to access the access point. The Bluetooth™ module is reactivated to search the access point if the WLAN module scans and detects no access point after a certain number of attempts or a signal power of the WLAN connection drops below a certain threshold, and the first access point and the second access point are configured to be implemented together.

As related to wireless networks, this invention is related to the telecommunication area, however, the solution may also cover the possible other uses of the employment of both Bluetooth and WLAN protocols out of this area. As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

What is claimed is:

1. A method of selecting a wireless network in a mobile terminal, the method performed by the mobile terminal and comprising:
receiving a first network inquiry command in a certain interval from a first wireless network;
activating a first wireless network module of the mobile terminal upon receiving the first network inquiry command from the first wireless network;
sending a first network inquiry response from the first wireless network module to the first wireless network;
receiving a second network inquiry command from the first wireless network for establishing a first wireless network connection between the first wireless network and the mobile terminal;
activating a second wireless network module of the mobile terminal when the first wireless network module receives the second network inquiry command;
scanning a second wireless network using the activated second wireless network module; and establishing a second wireless network connection between the second wireless network and the mobile terminal, wherein the mobile terminal uses the first wireless network connection in a lower data transfer rate than the second wireless network connection.

2. The method of claim 1, wherein the first wireless network connection or the second wireless network connection are established via an access point.

3. The method of claim 2, further comprising:

sending parameter and profile information regarding the first wireless network module and the second wireless network module to the access point after activating the second wireless network module.

4. The method of claim 3, wherein the first wireless network is a Bluetooth™ network and the second wireless network is a Wireless Local Area Network (WLAN).

5. The method of claim 4, further comprising:

enabling a Bluetooth™ Page State at the mobile terminal after sending the parameter and profile information.

6. The method of claim 4, wherein:

the first wireless network module is a Bluetooth™ module;

the second wireless network module is a WLAN module;

the access point is configured to communicate with a mobile device enabling at least the WLAN network or Bluetooth™ network and a computer having at least the WLAN module or Bluetooth™ module; and the WLAN comprises at least Wireless Fidelity (WI-FI), Wi-Max™, Wi-Bro™ or Brew™.

7. The method of claim 2, further comprising:

scanning the first wireless network to search for a Gateway Cordless Telephony Profile Device (GCTPD) after activating the first wireless network module, wherein the GCTPD is used in the access point.

8. The method of claim 7, further comprising:

deactivating the first wireless network module when the first wireless network module did not detect the access point after scanning the first wireless network a certain number of attempts, wherein the second wireless network module is activated when the first wireless network module is deactivated.

9. The method of claim 2, wherein the mobile terminal performs a communication via a Voice-Over-Internet-Protocol (VOIP) in at least the first wireless network or second wireless network.

10. The method of claim 2, wherein the mobile terminal transitions into a discoverable device state to scan for a Gateway Cordless Telephony Profile Device (GCTPD) using the first wireless network module if the second wireless network module scans and does not detect the access point in the second wireless network.

11. The method of claim 10, further comprising:

deactivating the second wireless network module after reactivating the first wireless network module following a loss of the first wireless network connection and a deactivation of the first wireless network module.

12. The method of claim 10, further comprising:

reactivating the first network module, following a loss of the first wireless network connection and a deactivation of the first wireless network module, to scan for the access point if the second wireless network module scans and does not detect the access point after a certain number of attempts or a power value of the second wireless network connection drops below a certain threshold value.

13. A method of allowing a mobile communications device including a first wireless network module and a second wireless network module to select a wireless network, the method comprising:

sending a first inquiry command in a certain interval from a first wireless network to the mobile communications device;

receiving an inquiry response from the first wireless network module in response to the first inquiry command, wherein the first wireless network module is activated when the mobile communications device receives the first inquiry command;

sending a second inquiry command from the first wireless network to the first wireless network module in order to establish a first wireless network connection with the mobile communications device;

receiving information regarding the first wireless network module and the second wireless network module from the mobile communications device after the second wireless network module is activated, wherein the second wireless network module is activated when the mobile communications device receives the second inquiry command; and establishing a second wireless network connection between a second wireless network and the second wireless network module, wherein the first wireless network operates in a lower data transfer rate than the second wireless network.

14. The method of claim 13, wherein the first wireless network connection or the second wireless network connection are established via an access point.

15. The method of claim 14, wherein the first wireless network is a Bluetooth™ network and the second wireless network is a Wireless Local Area Network (WLAN).

16. A mobile terminal for selecting a wireless network, the mobile terminal comprising:

a first wireless network module configured to establish a first wireless network connection with a first access point on a first wireless network;

a second wireless network module configured to establish a second wireless network connection with a second access point on a second wireless network;

a storage device configured to store information regarding the first wireless network module and the second wireless network module; and a controller configured to:

cooperate with the first wireless network module, the second wireless network module and the storage device to activate the first wireless network module;

activate the first wireless network module when a first inquiry is received from the first access point for establishing the first wireless network connection;

send a first inquiry response to the first access point in response to the first inquiry;

activate the second wireless network module when the first wireless network module receives a second inquiry for establishing the second wireless network connection; and transmit parameter and profile information regarding the first wireless network module and the second wireless network module to the first access point after the second wireless network module is activated, wherein the mobile terminal establishes the first wireless network connection in a lower data transfer rate than the second wireless network connection.

17. The mobile terminal of claim 16, wherein the first wireless network is a Bluetooth™ network and the second wireless network is a Wireless Local Area Network (WLAN), and wherein the WLAN comprises at least Wireless Fidelity (WI-FI), Wi-Max™, Wi-Bro™ or Brew™.

18. The mobile terminal of claim 17, wherein the first wireless network module is a Bluetooth™ module and the second wireless network module is a WLAN module, the mobile terminal further comprising:

an output unit configured to display a user interface capable of allowing a user of the mobile terminal to select the Bluetooth™ module to access the first access point or the WLAN module to access the second access point.

19. The mobile terminal of claim 17, wherein the first wireless network module is a Bluetooth™ module and the second wireless network module is a WLAN module, the mobile terminal further comprising:

an input unit configured to allow a user of the mobile terminal to select the Bluetooth™ module to access the first access point or the WLAN module to access the second access point.

20. The mobile terminal of claim 17, wherein:

the first wireless network module is a Bluetooth™ module;

the second wireless network module is a WLAN module; and the Bluetooth™ module is configured to be reactivated to search the first access point if the WLAN module does not detect the second access point after a certain number of attempts or a power value of the second wireless network connection drops below a certain threshold value.

21. The mobile terminal of claim 16, wherein the second wireless network module is further configured to communicate via a Voice-Over-Internet-Protocol (VOIP) in the second wireless network.

22. The mobile terminal of claim 16, wherein the first access point and the second access point are configured to be implemented together.

* * * * *